United States Patent [19]
Krickler

[11] 3,803,422
[45] Apr. 9, 1974

[54] DISPLACEMENT HYDRO ELECTRIC GENERATOR APPARATUS

[76] Inventor: Frank Krickler, 621 N.W. 65th Ter., Margate, Fla. 33063

[22] Filed: Oct. 18, 1971

[21] Appl. No.: 189,924

[52] U.S. Cl. .................. 290/52, 290/1, 417/229
[51] Int. Cl. ............................................. H02k 7/18
[58] Field of Search ....... 417/229; 104/271; 290/52, 290/1

[56] References Cited
UNITED STATES PATENTS

| | | | |
|---|---|---|---|
| 3,372,645 | 3/1968 | Willi | 290/52 |
| 792,839 | 6/1905 | Neathery | 417/229 |
| 2,020,361 | 11/1935 | Johnston | 417/229 |
| 1,771,200 | 7/1930 | Akers | 417/229 |
| 3,088,417 | 5/1963 | Johnston | 417/229 |
| 450,062 | 4/1891 | Estes | 417/229 |
| 565,429 | 8/1896 | Chaquette | 417/229 |
| 3,536,929 | 10/1970 | Parker | 290/52 |

Primary Examiner—G. R. Simmons
Attorney, Agent, or Firm—Harry N. Schofer

[57] ABSTRACT

A device for producing electricity, consisting of a hydraulic pump including a cylinder having a floating piston and ramps disposed in a highway or a portion of a lake along a highway, the arrangement being such that, under the weight of passing automobiles, trucks and similar roadway vehicles, the piston will be depressed to force water from the cylinder into an elevated reservoir. The reservoir discharges through a valve controlled pipe and through a hydraulic turbine connected with an electrical generator to produce electrical energy.

6 Claims, 5 Drawing Figures

DISPLACEMENT HYDRO ELECTRIC GENERATOR APPARATUS

BACKGROUND OF THE INVENTION

1. Field of the Invention

This invention relates to the production of electrical energy, and more particularly to a hydroelectric generating apparatus in which water is displaced under the weight of automobiles, buses, trucks and similar vehicles passing along a vehicular roadway.

It is an object of this invention to utilize the weight of automotive vehicles passing along a portion of a roadway to generate electrical energy through the medium of one or more displacement hydraulic pumps having pistons over which the vehicles pass.

It is a further object to provide a novel electrical energy generating system disposed in a restricted speed section of a vehicular roadway in which platforms and ramps are disposed in a portion of the roadway which are effective to maintain a desired maximum speed of the vehicles and at the same time produce electrical energy.

It is a still further object to provide a novel electrical energy generating system having a displacement hydraulic pump disposed within a reservoir, and means to maintain a predetermined water level within the reservoir.

It is a still further object to provide a novel electrical energy generating system which furnishes the maximum electrical energy output at periods coinciding with the maximum power demands for electrical energy.

It is a still further object to provide a novel electrical energy generating system which is simple in design, inexpensive to manufacture, rugged in construction and economical to operate.

SUMMARY OF THE INVENTION

The attainment of the above and other objects and advantages will become readily apparent from the description which follows.

In brief, the invention consists of a number of hydraulic displacement type pumps disposed along a section of a roadway traversed by automobiles, trucks, buses and similar vehicles. These vehicles may vary in weight from about a ton for a small compact automobile to 10 or more tons for large trucks and the like.

These pumps comprise relatively large cylinders, large enough to accommodate a large roadway vehicle, and each cylinder having a large piston. The pumps are disposed in a position along the roadway where they can be traversed by passing vehicles, and in such a position that the tops of the pistons, in their upper or unloaded position, are slightly above the surface of the roadway. Ramps interconnect the upper surface of the pistons with the adjacent roadway to permit passing vehicles to adjust to the difference in elevation without noticeable jar to the passengers or contents in passing vehicles.

The cylinders are connected with a body of water having an elevation slightly less than the level of the roadway, and the pistons comprise floats riding on the surface of the water within the cylinders so that, in the unloaded state, the cylinders quickly fill with water from a number of check valve controlled inlet ports and the pistons float to their upper positions with their upper surfaces at an elevation slightly above the adjacent roadway level.

The weight of passing vehicles depresses the pistons, forcing the water from within the cylinders into an elevated reservoir. By means of a control valve, the water from the reservoir may be fed through a hydraulic turbine connected with an electric generator, for the generation of electrical energy. The generator may be connected with an electrical generating system to augment the system at periods of peak demand for electrical energy, which coincides with the periods of peak traffic flow.

BRIEF DESCRIPTION OF THE DRAWINGS

A clearer understanding of the invention and its operation will be apparent from the following detailed description and the annexed drawings, in which:

FIG. 5 is a sectional view through a wall of the pump cylinder taken along the line 5—5 of FIG. 2.

Figure 1:
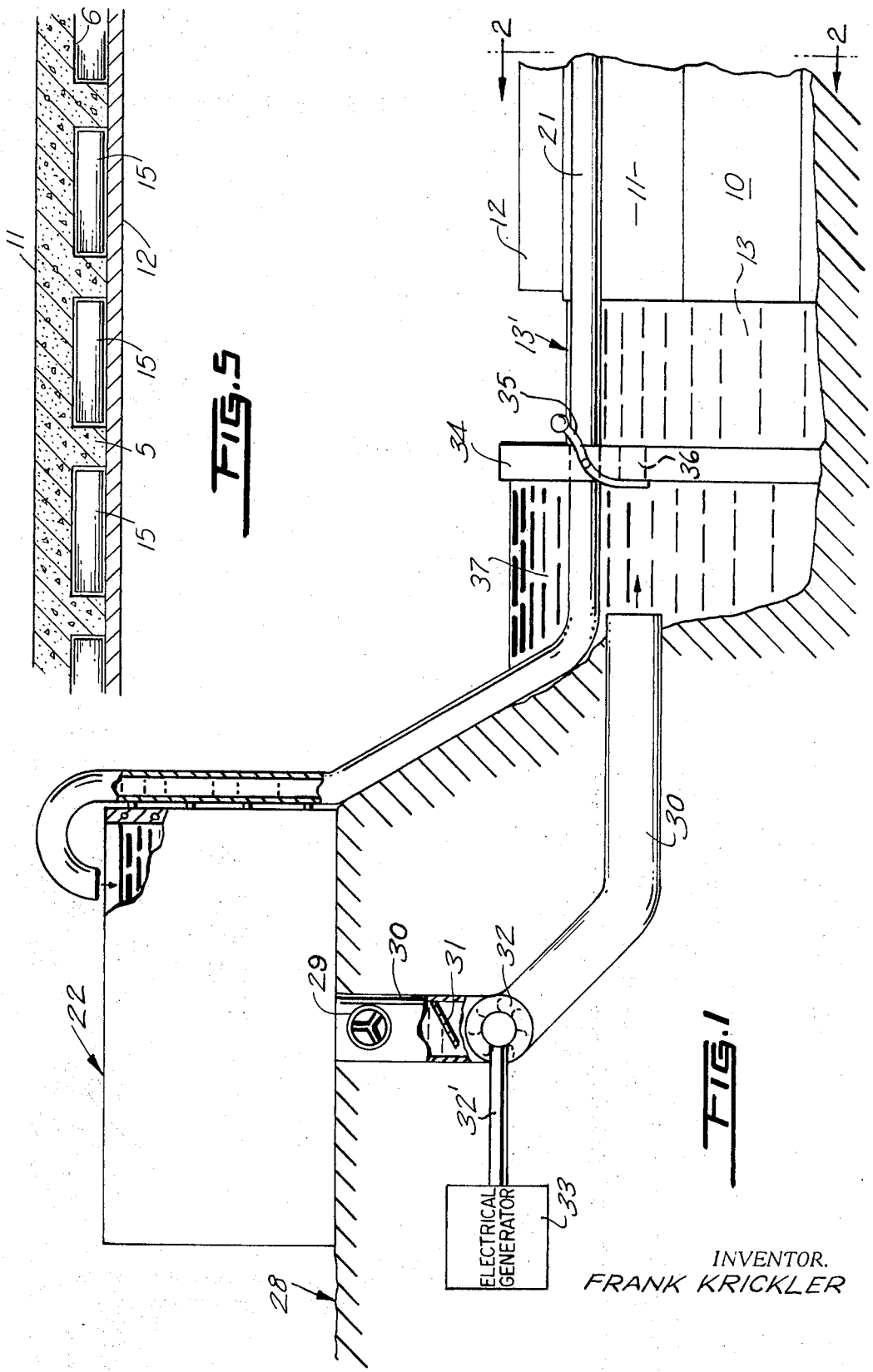
FIG. 1 is a schematic representation of a preferred embodiment of the invention.

Referring to the annexed drawings, the numeral 10 designates a hydraulic displacement pump comprising a cylinder 11 and a piston 12. The cylinder 11 is shown as having a rectangular cross section, the shorter length being disposed lengthwide of a roadway 16, and the longer side being disposed transversely of the roadway. The cylinder is made from reinforced concrete and is placed on the bed 8 of a body of water 13 occupying a section of the roadway. The lower part of the cylinder 11 is thickened at 9 to provide increased strength and also increased weight to assure that the cylinder will not float in the body of water 13.

The piston 12 is also rectangular in cross section, and of dimensions to fit nicely within the cylinder 11. The piston 12 is hollow, or made from suitable light weight material, to float on the surface of the water within the cylinder. To prevent binding of the piston with the walls of the cylinder 11, the latter is provided with a plurality of spaced, vertically extending, ribs 6 (FIG. 5) forming a series of tracks or guides 19 receiving rollers 15 between the piston 12 and the wall of the cylinder 11.

Figure 2:
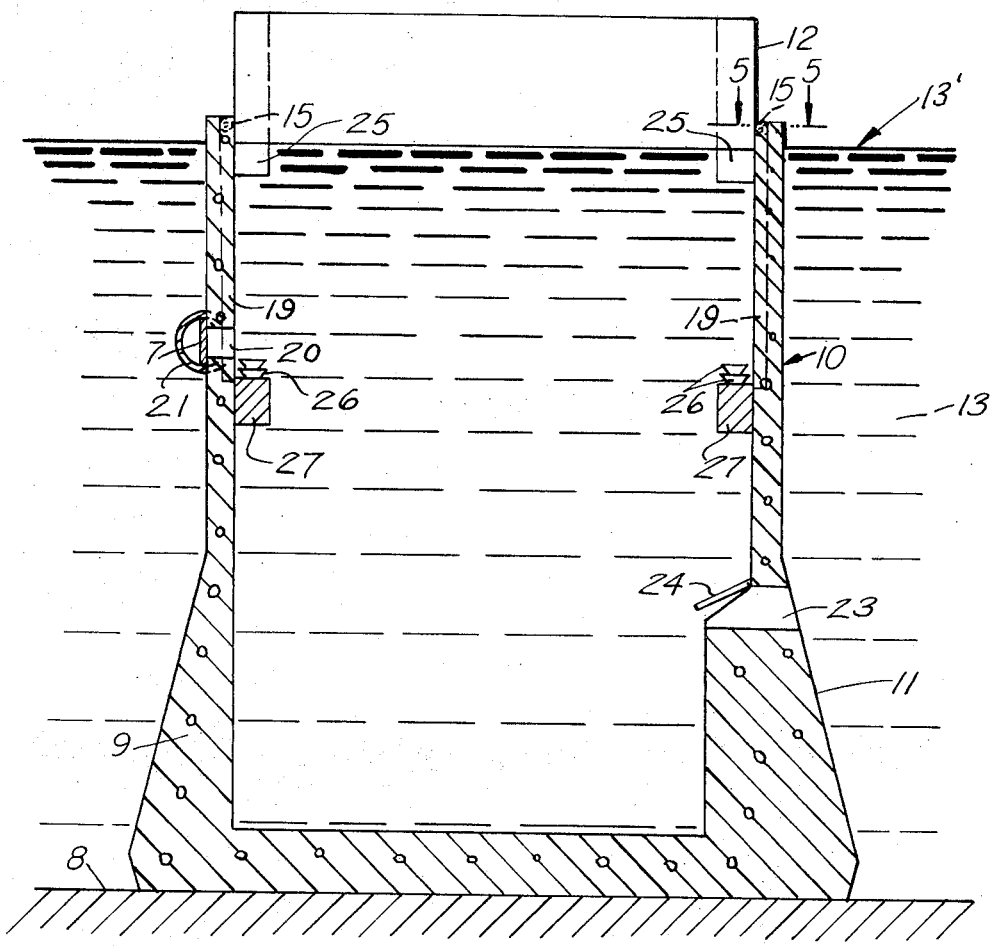
FIG. 2 is a sectional view through the pump, taken along the line 2—2 of FIG. 1.

As seen in FIG. 2, one sidewall of the cylinder 11 has a series of spaced ports 20, each port being controlled by an outwardly opening check valve 7. The ports 20 are disposed at the same level along the sidewall of the cylinder 11 and discharge into a pipe means 21. The opposite sidewall of the cylinder 11 has a series of spaced ports 23 disposed in a row (FIG. 4) and at a lower level than the ports 20. Each of the ports 23 connects with the body of water 13 and is controlled by an inwardly opening check valve 24.

In order to limit and cushion the downward movement of the piston 12, the lower surface of the piston carries bumpers 25 adapted to engage a series of spaced bumper springs 26 supported by horizontal members 27 attached to the sidewalls of the cylinder 11, just below the ports 20.

Figure 3:
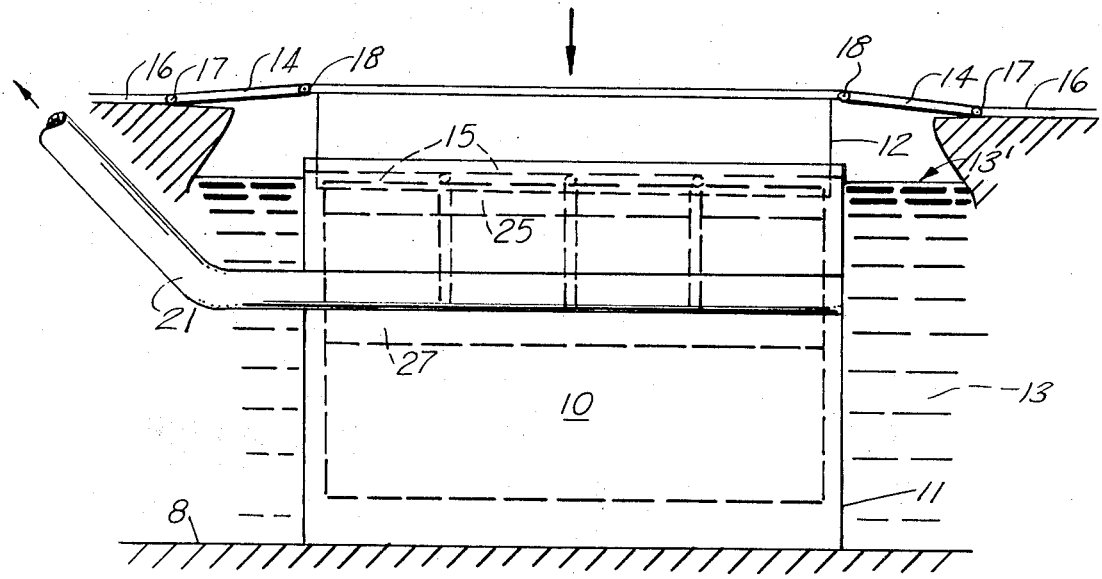
FIG. 3 is a side view of the pump as seen from the left hand side of FIG. 2.
Figure 4:
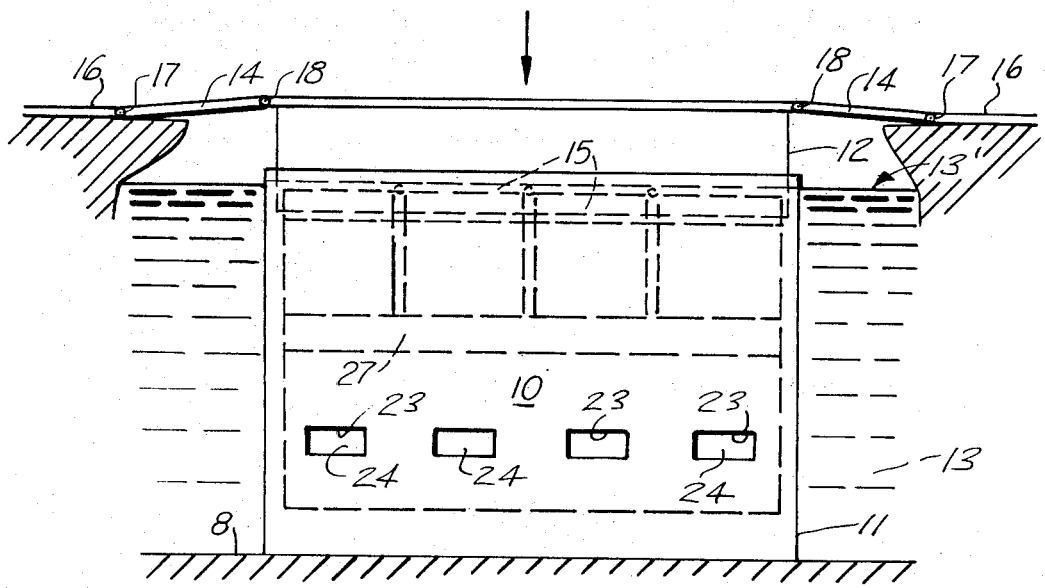
FIG. 4 is a side view of the pump as seen from the right hand side of FIG. 2.

In operation, a series of small bodies of water 13 are provided in a section of a roadway 16 traversed by automobiles, trucks, buses and similar vehicles, in an area wherein the speed is maintained at a relatively low limit, such as 25 to 35 miles per hour. The bed 8 of the body of water 13 is sufficiently below the level of the roadway 16 so that, when a pump 10 is disposed within the body of water, the upper surface of the piston 12, in its unloaded state, is disposed slightly above the surface of the roadway, as shown in FIGS. 3 and 4. The sides of the cylinder 11 are disposed a short distance from the adjoining road bed, and a pair of ramps 14 are arranged to bridge the space between the piston and roadway, being hinged at one end at 17 and having rollers 18 on the other end riding on the upper surface of the piston. Obviously, the ramps may be hinged at the upper surface of the piston and have rollers on the end contacting the adjacent roadway.

The pipe means 21 may be connected with a number of pumps 10 disposed in close relation with one another along the section of the roadway to receive the discharge through the ports 20 of each. The outlet end of the pipe means 21 discharges into a reservoir 22 disposed on a support 28 elevated a considerable distance above the level of the body of water 13. The reservoir 22 discharges by way of a conduit 30 through the blades of a hydraulic turbine 32, the effluent from the turbine discharging into a water supply 37. A control valve 29 in the conduit 30 regulates the flow through the turbine 32, and the conduit 30 includes a baffle or deflector 31 to direct the water at the most efficient angle through the turbine blades. The turbine 32 drives an electrical generator 33 through a connecting shaft 32'.

In order to maintain a desired liquid level 13' in the body of water 13, a connection is made through a dam or partition 34 with a water supply 37, which may be a lake or a pond, having a liquid level constantly higher than the desired level 13' in the body of water 13. The partition or dam 34 includes an opening 36 controlled by a float controlled valve 35 responsive to the liquid level within the body of water 13.

In operation, the liquid level 13' of the body of water 13 is maintained at a level slightly below that of the roadway 16 so that the piston 12, in its unloaded state and floating on the water within the cylinder 11, occupies a position slightly above the level of the roadway as seen in FIGS. 3 and 4. Vehicles traversing the roadway 16 will ride up the ramp 14 and onto the upper surface of the piston 12, forcing the piston downward under the weight of the vehicle as indicated by the arrows. The downward movement of the piston 12 forces the water from within the cylinder 11 through the ports 20, forcing open the check valves 9, through the pipe means 21 and into the elevated reservoir 22. The degree of depression of the piston 12 under the weight of the passing vehicle will obviously be a function of the weight of the vehicle and the time it takes to traverse the upper surface of the piston and the ramps, which depends on the speed of the vehicle. The degree of depression, and the quantity of water delivered from the cylinder, is also a function of the resistance to flow offered by the discharge ports 20 and the pipe means 21, which, by judicious design, can be chosen to offer the optimum flow conditions to take the flow from vehicles having different weights.

Assuming that a piston 12 is depressed only a few inches under the weight of a passing vehicle, the downward force ceases when the vehicle rides off the exit ramp. There will then exist a difference in level between the level of the water within the cylinder 11 and the level 13' of the body of water, causing the water from the body of water 13 to enter the cylinder through the inlet ports 23, forcing open the check valves 24, filling the cylinder 11 until the level within the cylinder equals that of level 13' of the body of water 13, and causing the piston 12 to float to its upper position shown in FIG. 2. The check valves 9 are maintained closed during this filling operation by the weight of the water remaining within the pipe means 21. If vehicles pass in such quick succession that a following vehicle traverses the piston 12 before the cylinder is refilled with water, the piston 12 continues its downward movement in increments under the weight of the successive passing vehicles until its downward movement is arrested by the bumper 25 striking the bumper springs 26, and the passing vehicles, in traversing the piston 12, will ride downward on the approaching ramp 14 and upward on the exit ramp. It should be noted, however, that the extent of movement permitted by the piston is only a few inches above and below the level of the roadway 16, so that there is never any objectionable jarring or bumping to passing vehicles to create any dangerous driving conditions as they traverse the pump or pumps disposed in the roadway in succession.

As more and more water is pumped from the pumps under the weight of passing vehicles, and the liquid level 13' drops, the float valve becomes operative to open the opening 36 through the dam 34 to restore the liquid level 13' in the body of water 13.

To obtain electrical energy, the valve 29 is opened, to permit the water from the reservoir 22 to pass through the blades of the hydraulic turbine 32, the baffle or deflector 31 directing the water at the proper angle through the blades of the turbine to drive the electrical generator 33. The discharge from the turbine is led through the tail pipe into the water supply 37.

The electrical generator 33 may be electrically connected with other sources of electrical energy to supply additional electricity at peak load periods, which coincide with peak traffic load periods. Studies of electrical power consumption show that the peak loads occur between 6 and 9 A.M., and between 4 and 8 P.M., which coincide with the peak loads in vehicular traffic. It is evident, therefore, that it is not required to provide excessively large storage reservoirs to collect the water, since the electrical demands are such that the water pumped into the reservoir can be simultaneously utilized to operate the turbine driven electrical generator to augment the usual electrical generating system to meet the power demands. Between such peak traffic flow periods, the traffic falls off sharply and consequently the amount of water pumped also diminishes.

I claim:

1. In an automotive roadway for automobiles, trucks and similar vehicles, an electrical energy generating system, comprising: a displacement pump having a cylinder and a piston, said pump disposed in a portion of the roadway with the upper surface of the piston slightly above the level of the roadway in a position to be traversed by passing vehicles; means supplying water to said cylinder; said cylinder being disposed within a body of water having a surface level slightly below the roadway level, said means supplying water to said cylinder being connected with said body of water, said piston comprising a float member adapted to float on the surface of the water within the cylinder; a reservoir disposed at an elevation above the level of the roadway; pipe means interconnecting said cylinder with said reservoir whereby the discharge from the cylinder is led to said reservoir; a hydraulic turbine disposed at an elevation below that of the reservoir whereby the water from the reservoir may discharge by gravity through said turbine; a conduit interconnecting said reservoir with said turbine; a control valve in said conduit to regulate the flow of water therethrough; and an electrical generator connected with and driven by said turbine.

2. An electrical energy generating system as defined in claim 1, including hinged ramps interconnecting the piston and the surface of the roadway.

3. An electrical energy generating system as defined in claim 1, incluidng rollers disposed between said piston and the walls of said cylinder.

4. An electrical energy generating system as defined in claim 1, including bumper means between said piston and said cylinder to limit and cushion the downstroke of said piston under the weight of passing vehicles.

5. An electrical energy generating system as defined in claim 1, including float actuated valve means maintaining the surface level in said body of water.

6. An electrical energy generating system as defined in claim 1, including a contiguous second body of water having a surface level higher than the level in said first body of water in which the cylinder is disposed, a partition having an opening separating said bodies of water, and said float actuated valve means controlling the flow of water through said opening.

* * * * *